United States Patent
Ueda et al.

[11] Patent Number: 5,969,895
[45] Date of Patent: Oct. 19, 1999

[54] DISK DRIVE APPARATUS AND HEAD SWITCHING METHOD IN A DISK DRIVE APPARATUS

[75] Inventors: Tetsuo Ueda, Sagamihara; Atsushi Tobari, Fujisawa; Yoshihiro Nakagawa, Ebina; Kazushige Okutsu, Fujisawa, all of Japan

[73] Assignee: International Business Machines Corporation, Armonk, N.Y.

[21] Appl. No.: 08/824,423

[22] Filed: Mar. 26, 1997

[30] Foreign Application Priority Data

Mar. 26, 1996 [JP] Japan .................................. 8-069814

[51] Int. Cl.$^6$ ....................................................... G11B 5/55
[52] U.S. Cl. ........................................... 360/61; 360/77.04
[58] Field of Search .................................. 360/60–61, 64, 360/77.04

[56] References Cited

U.S. PATENT DOCUMENTS 5,208,711  5/1993  Kitamura et al. ..................... 360/78.04

OTHER PUBLICATIONS

Patent Abstracts of Japan, for JP 8–287,439, 1996.

*Primary Examiner*—W. R. Young
*Attorney, Agent, or Firm*—Ingrid M. Foerster; Randall J. Bluestone

[57] ABSTRACT

The present invention provides a method and apparatus to efficiently switch heads in a disk drive. A disk drive comprises a plurality of recording surfaces and a plurality of heads and each head is opposed to a recording surface. The heads are used for reading data from or writing data to the plurality of recording surfaces. An offset quantity table stores an offset quantity for each of the plurality of heads. The offset quantity is a value representative of the distance of a head with respect to a reference head. A head sequence table stores a predetermined head switching sequence. Head switching operations use the head switching sequence stored in the head sequence table.

8 Claims, 6 Drawing Sheets

| HEAD | OFFSET QUANTITY (TRACK) |
|---|---|
| HEAD 0 | 0.0 |
| HEAD 1 | 0.6 |
| HEAD 2 | 1.4 |
| HEAD 3 | 1.0 |
| HEAD 4 | 1.8 |
| HEAD 5 | 2.5 |

| HEAD | OFFSET QUANTITY (TRACK) |
|---|---|
| HEAD 0 | 0.0 |
| HEAD 1 | 0.6 |
| HEAD 2 | 1.4 |
| HEAD 3 | 1.0 |
| HEAD 4 | 1.8 |
| HEAD 5 | 2.5 |

FIG. 5

| | HEAD NUMBER |
|---|---|
| 0 | 0 |
| 1 | 1 |
| 2 | 3 |
| 3 | 2 |
| 4 | 4 |
| 5 | 5 |

FIG. 6

| | HEAD NUMBER |
|---|---|
| 1 | 5 |
| 2 | 4 |
| 3 | 2 |
| 4 | 3 |
| 5 | 1 |
| 6 | 0 |

FIG. 7

(C, H)  C: CYLINDER  H: HEAD (0, 0) → (0, 1) → (0, 2) → (0, 3) → (0, 4) → (0, 5)
→ (1, 0) → (1, 1) → (1, 2) → (1, 3) → (1, 4) → (1, 5)
→ (2, 0) → (2, 1) → (2, 2) → (2, 3) → (2, 4) → (2, 5)

| OPERATION | | SEEK QUANTITY |
|---|---|---|
| HEAD SWITCHING | × 5 | 3.3 TRACKS |
| CYLINDER SWITCHING | × 1 | 1.5 TRACKS |
| HEAD SWITCHING | × 5 | 3.3 TRACKS |
| CYLINDER SWITCHING | × 1 | 1.5 TRACKS |
| HEAD SWITCHING | × 5 | 3.3 TRACKS |
| TOTAL | | 12.9 TRACKS |

FIG. 9 (PRIOR ART)

DISK DRIVE APPARATUS AND HEAD SWITCHING METHOD IN A DISK DRIVE APPARATUS

FIELD OF THE INVENTION

The present invention relates to a method and apparatus for efficiently switching heads in a disk drive having multiple heads, and in particular to a method and apparatus for switching heads by setting a head switching sequence based on an amount of offset between heads.

BACKGROUND OF THE INVENTION

Typically, in hard disk drives, circular data tracks are formed concentrically on a magnetic disk. Information is read from or written to the disk after a seek operation is performed. That is, the disk is rotated and a magnetic head is moved radially over the disk to position the head over a desired data track. To position the head over the desired data track, the head reads prerecorded head position identification information and burst patterns from the disk.

FIG. 1 shows an exemplary disk suitable for practicing the present invention. Each track on the disk 18 is divided into data regions 52 and servo regions 50. The head recognizes the position on the disk 18 based on servo data recorded in the servo region 50. After positioning the head over the desired data track, data is read from or written to the disk 18.

The servo data comprises head position identification information including cylinder (CYL) and sector (SEC) position information which are recorded with a gray code and a binary code respectively. A burst pattern is also recorded in the servo data following the gray and binary codes. The burst pattern provides a signal, i.e., a fine-servo signal, which is used to make fine adjustments to position the head over the desired track. The head is positioned over the track by reading the blocks of servo data.

FIG. 2 shows a portion of the head position identification information and burst pattern regions recorded on the disk suitable for practicing the present invention. In FIG. 2, the disk rotates in the circumferential direction as indicated by arrow F. The head (not shown) moves radially across the disk as indicated by an arrow G. The disk has a plurality of concentric circular data tracks 100A, 100B, 100C, . . . where blocks of data are recorded. The head position identification information is recorded in a head position identification region 102 and the burst pattern is recorded in a burst pattern region 104. The head position identification information region 102 and burst pattern region 104 are located between adjacent data tracks.

To identify a particular data track, each data track is given a track address. A predetermined number of bits of identification information are recorded in the head position identification region 102. The cylinder address of the corresponding data track is encoded with a gray code, which is a cyclic binary code. The sector address is encoded with a binary code. A plurality of burst pattern strings 106A, 106B, 106C, and 106D are recorded in the burst pattern region 104. For example, in the shaded area of FIG. 4, four burst pattern strings 106A, 106B, 106C, and 106D are arranged radially along the disk.

The head outputs a read signal each time the head is disposed over the head position identification information region 102. To position the head with respect to the desired data track, the track address of the data track below the head is calculated based on the head position identification information contained in the read signal. When the head reaches the desired data track, signals obtained by reading the plurality of burst pattern strings are analyzed, and a position detection signal is generated. The amplitude of the position detection signal changes linearly depending on the position of the head with respect to the burst pattern signals. Based on the position detection signal, the center of the gap of the head is positioned over the centerline of the target data track.

In a disk drive having multiple heads, the heads are switched when sequential data is written to or read from a cylinder, which comprises different disk surfaces of the disk drive. For example, if a disk drive has two disks and four heads, numbered 0, 1, 2, and 3, then the heads are typically switched in the sequence of the head numbers 0, 1, 2, and 3 during a data read or write operation. That is, if a data write operation using head 0 reaches the end of track 2500 on the disk, then head 0 is switched to head 1 and the data write operation continues in the same cylinder at track number 2500 corresponding to head 1. Similarly, sequential data continues to be written to cylinder number 2500 using heads 2 and 3.

In disk drives having multiple disks, the heads are arranged in a fixed vertical or radial relationship with respect to one another. FIG. 3 shows the relative position between heads when the servo information is recorded on the disk. Generally, servo information on all disk surfaces is radially aligned. As a consequence, a seek operation following a head switch is not necessary. In other words, as shown in FIG. 3, when one head, 0, 1, 2 or 3, is positioned opposite a desired track n, the other heads are also positioned opposite the desired track n in the same cylinder.

However, when assembling heads and disks having the prerecorded servo information, a relative offset occurs between the heads radially along the disk, i.e. in the off-track direction. The radial or off-track offset is caused for example, by the inclination of the rotary shaft of the spindle motor, the inclination of the VCM for a head, or the distortion from clamping. More specifically, when writing servo data with a servo writer, the servo pattern is written at a position having no disk shift. However, distortion occurs when the servo writer is removed during the process to remove and attach the clamp, and in subsequent disk drive operation over time. Therefore, as shown in FIG. 4, the heads have a relative radial or off-track offset β in the assembled disk drive.

Assume that the aforementioned head switching operation is executed in a disk drive having heads positioned as shown in FIG. 4. Although FIG. 4 shows each head having a circumferential offset α with respect to the other heads, i.e, offset along the circumference of the disk, for easier understanding, in practice there is no circumferential offset between heads. When data is written to track n with head 0 and then to track n with head 1, head 1 is moved from its position opposite track n+1 to track n. Therefore, a one track seek operation is required. Therefore, if a disk drive has an off-track offset between heads, a seek operation becomes necessary to properly align the active head when heads are switched. If the amount of off-track offset increases, then, after switching heads, the distance to move the head to the desired track increases. Because the seek distance increases, the seek time also increases. When reading or writing a long stream of data, many seek operations need to be executed. Therefore, reduction of seek time is an important factor in improving disk drive performance.

SUMMARY OF THE INVENTION

An object of the invention is the efficient execution of head switching in a disk drive.

Accordingly, the present invention minimizes the seek time in disk drives having multiple heads when heads are switched when each head has the aforementioned off-track offset. The present invention reduces the time needed for head switching, and thereby improves the performance of data read and write operations. In particular, when the head switching operation needs to be executed multiple times to read or write data on a plurality of tracks and sectors, the processing time is effectively reduced by reducing the seek time.

In a disk drive of the present invention, the offset quantities, i.e., values corresponding to the amount of off-track offset between heads, are pre-measured, and the head switching sequence is determined by using the offset quantities. More particularly, the next head to switch to is the head having the smallest offset quantity. Since the current head is switched to the head having the smallest relative offset, the seek time to switch heads is reduced.

In the disk drive of the present invention, offset quantities are stored as data in a table, and the off-track offset of each head is represented by the distance (in tracks) from from a reference head. The disk drive also has a head sequence table which defines the head switching sequence so that head switching is achieved by minimizing the relative offset between respective heads, based on the data stored in the offset quantity table. The offset quantity table is stored and retained in a predetermined region of the disk. When actually used, the offset quantity table is loaded into a memory, e.g., RAM, for the hard-disk controller to access.

For example, in the offset quantity table, the head positioned on the outermost side of the disk is used as a reference head. The offset quantity between the reference head and the other heads is represented in units of tracks. Each head has a corresponding offset quantity. For example, it shall be assumed that in a disk drive with four heads, 0, 1, 2, and 3, head 0 is positioned on the outermost side of the disk. It shall also be assumed that heads 1, 2, and 3 have offsets of 1.5, 0.7 and 1.2, respectively, relative to head 0. That is, if head 0 is selected as the reference head, and head 1 is offset from head zero by 1.5 tracks in the direction of the disk center, the offtrack quantity of head 1 is 1.5. If the off-track quantity of head 2 is 0.7 and the off-track quantity of head 3 is 1.2, the off-track quantity of head 2 with respect to head 0 is the smallest. Therefore, head 0 will be switched to head 2. In this manner, the seek time in switching heads is reduced by resequencing the order of head switching.

The aforementioned table is preferably recorded and stored in a region of the disk other than a user's data region and where the defective sectors, defective track information, etc., are recorded and stored. The table is read out from the disk when the HDD is powered up, and is loaded into a predetermined memory, e.g., a sector buffer memory. When a head is switched during reading or writing, the table in the memory is referenced.

BRIEF DESCRIPTION OF THE DRAWINGS

FIG. 5 is a diagram showing an exemplary offset quantity table used in a disk drive of a preferred embodiment of the present invention;

FIG. 6 is a diagram showing an exemplary head sequence table used in the disk drive of a preferred embodiment of the present invention;

FIG. 7 is a diagram showing an alternative exemplary head sequence table used in a disk drive of a preferred embodiment of the present invention;

FIG. 9 is a diagram showing the conventional head switching sequence and seek quantity in a conventional disk drive.

DETAILED DESCRIPTION OF THE PREFERRED EMBODIMENTS

Figure 1:
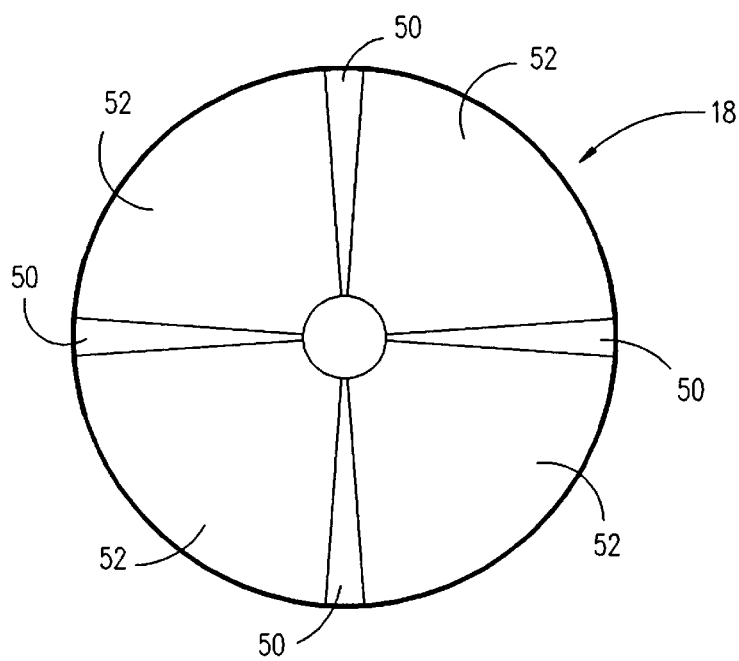
FIG. 1 is a diagram of an exemplary disk suitable for practicing the present invention.
Figure 2:
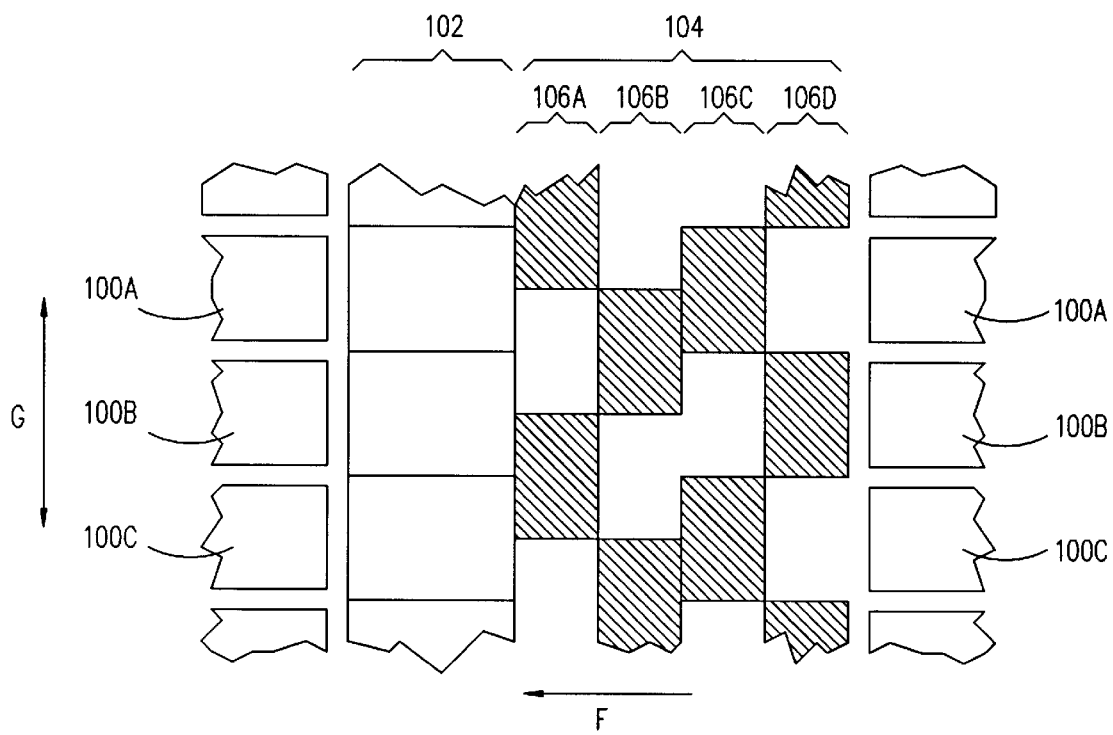
FIG. 2 is a diagram of the head position identification information regions recorded on a disk suitable for practicing the present invention.
Figure 3:
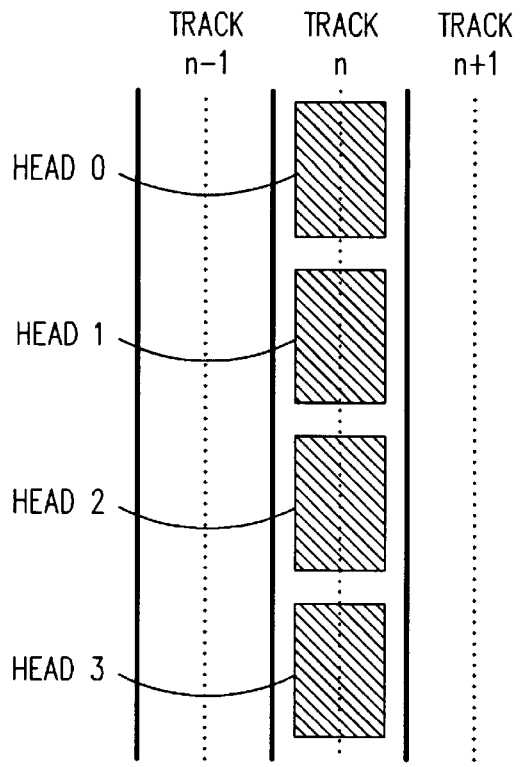
FIG. 3 is a diagram showing the relative position between heads when servo information is written on a disk suitable for practicing the present invention.
Figure 4:
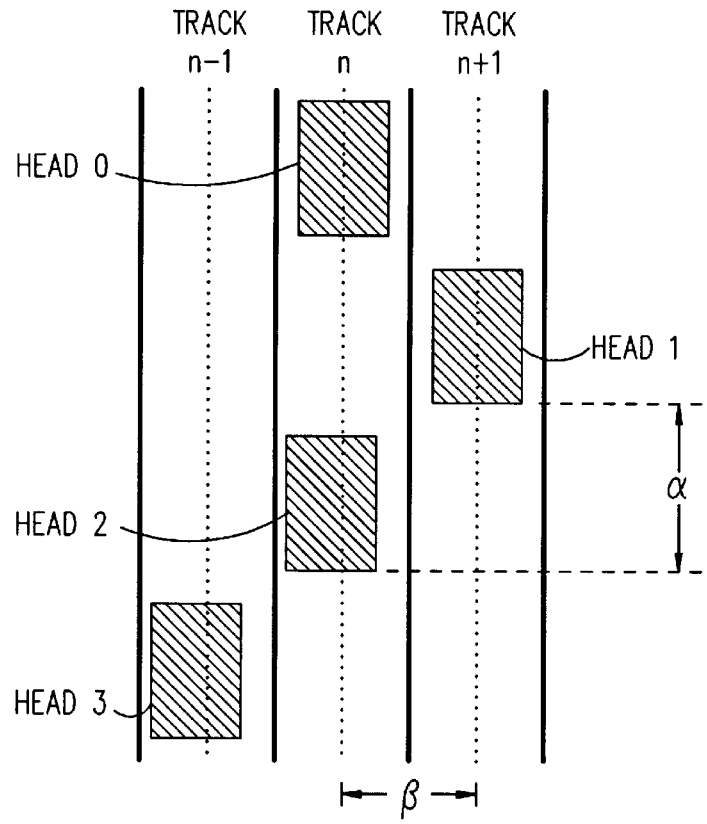
FIG. 4 is a diagram showing the relative position between heads after assembling a disk suitable for practicing the present invention.

According to the present invention, in a disk drive with multiple heads, the off-track offset quantity, i.e., the relative radial offset, is pre-measured after the disk drive is assembled. The offset quantity is measured by obtaining accurate position information for each head from the prerecorded servo information and reading the difference between the position information between the heads.

If a disk drive has n+1 heads, i.e, heads 0 to n, the head positioned nearest to the outermost side of the disk is first selected as a reference head, then an offset quantity is measured for each head. The offset quantity represents the amount of radial offset between a head and the reference head. Referring to FIG. 5, for example, if a disk drive has 6 heads, i.e., heads 0 to 5, and if the head 0 is the outermost head, then the offset quantities of heads 1 to 5 with respect to head 0 are obtained as shown in the offset quantity table. Because head 0 is the reference head, the offset quantity for head 0 is 0.0. The offset quantity of head 1 is 0.6, which means that head 1 is shifted 0.6 of a track toward the disk center with respect to head 0. Similarly, head 5 is shifted 2.5 tracks toward the inner side of the disk with respect to head 0.

FIG. 6 is a diagram of an exemplary head sequence table used in the disk drive of the present invention. For example, a sequence for switching heads is determined starting at head 0 nearest to the outer diameter of the disk and moving towards the inner side. The head sequence table represents and defines the sequence of switching the heads from head 0 at the outermost side to head 5 nearest the innermost side based on the offset information in the table of FIG. 5. The heads are switched using the head sequence table while reading or writing data. In the head sequence table of FIG. 6, the head switching sequence is defined as the sequence of head numbers 0, 1, 3, 2, 4, and 5, in order of smallest to largest head offset.

However, the head switching sequence varies depending on whether the maximum value of the offset quantity in the offset quantity table is greater than 2, or less than or equal to 2. If the maximum offset quantity is less than or equal to 2, the head switching sequence in the head sequence table of FIG. 6 is repeatedly executed for all cylinders. More specifically, if head switching is executed in cylinder n following the sequence of head numbers 0, 1, 3, 2, 4, and 5, and if a sequential data read or write operation causes a seek to cylinder n+1, then the last head (head 5) is switched to the first head (head 0). Thereafter for cylinder n+1, head switching repeats in the same sequence used for cylinder n, i.e., 0, 1, 3, 2, 4, and 5.

On the other hand, if the maximum offset quantity is greater than 2, the head switching is executed in cylinder n in the sequence of head numbers 0, 1, 3, 2, 4, and 5, as before. However, in cylinder n+1, the heads are switched in the reverse order of the sequence for cylinder n, i.e., 5, 4, 2, 3, 1, and 0, as shown in FIG. 7. Thereafter, the head sequences of FIGS. 6 and 7 alternately repeat for each cylinder change. For example, the head sequence table of FIG. 6 is used for odd cylinders, while the head sequence table of FIG. 7 is used for even cylinders. Therefore, the head switching sequence changes depending upon the cylinder where a head is positioned. The reversed sequence of FIG. 7 is based on the result of a comparison between the seek distance required to position head 0 over cylinder n+1 and the seek distance required to position head 5 from the current cylinder n to cylinder n+1. This result is obtained by switching the last head (head 5) to the first head (head 0) when the last head is positioned over cylinder n. In other words, when the maximum offset quantity between the heads is greater than or equal to 2, the distance required to move head 5 from cylinder n to cylinder n+1 is shorter than the distance required to move from the position of head 5 over cylinder n to the position of head 0 over cylinder n+1.

Figure 8:
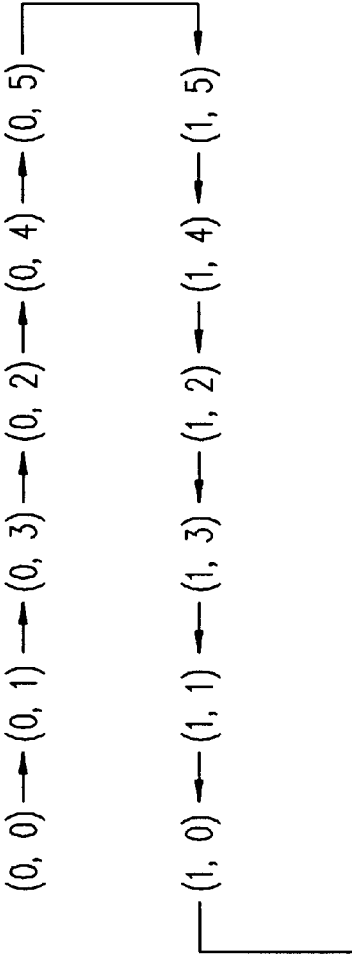
FIG. 8 is a diagram showing the head switching sequence and seek quantity in a disk drive of a preferred embodiment of the present invention.

FIG. 8 is a specific example of the head switching sequence and seek distance in a preferred embodiment of the present invention. FIG. 8 shows the sequence for switching heads and cylinders in a disk drive having the head offset quantities of FIG. 5. The cylinder number C and head number H are represented as (C, H). The operation column indicates what operation is performed and how many times the operation is executed. The seek quantify column indicates the distance traveled during the operation. Starting at cylinder 0, the head switching operation is executed in the following sequence of head numbers: 0, 1, 3, 2, 4, and 5, i.e., the sequence of FIG. 6. The head switching operation is executed five times, and the total seek distance for the five head switching operations is 2.5 tracks. When executing a head switching operation from cylinder 0 to cylinder 1, the maximum offset quantity obtained from FIG. 5 is 2.5 tracks for head 5. Since 2.5 is greater than 2, the head switching sequence for cylinder 1 is the reverse of the sequence for cylinder 0, i.e., the sequence of FIG. 7. Thereafter, if the head switching operation is executed up to cylinder 2, head 5, (C, H)=(2, 5), then the total seek distance required for all operations is 9.5 tracks.

The head switching sequence of the present invention will now be compared with a traditional fixed head switching sequence. FIG. 9 is a diagram showing the conventional head switching sequence and seek quantity in a conventional disk drive. The head switching sequence for FIG. 9 is set to the sequence of head numbers 0, 1, 2, 3, 4, and 5 and to the reverse sequence. Using the head offset quantities of FIG. 5, if the present invention is not used, the total seek distance is 12.5 tracks. Therefore, since the present invention requires 9.5 tracks, conventional disk drives require an additional seek distance of 12.5–9.5=3.0 tracks.

Figure 10:
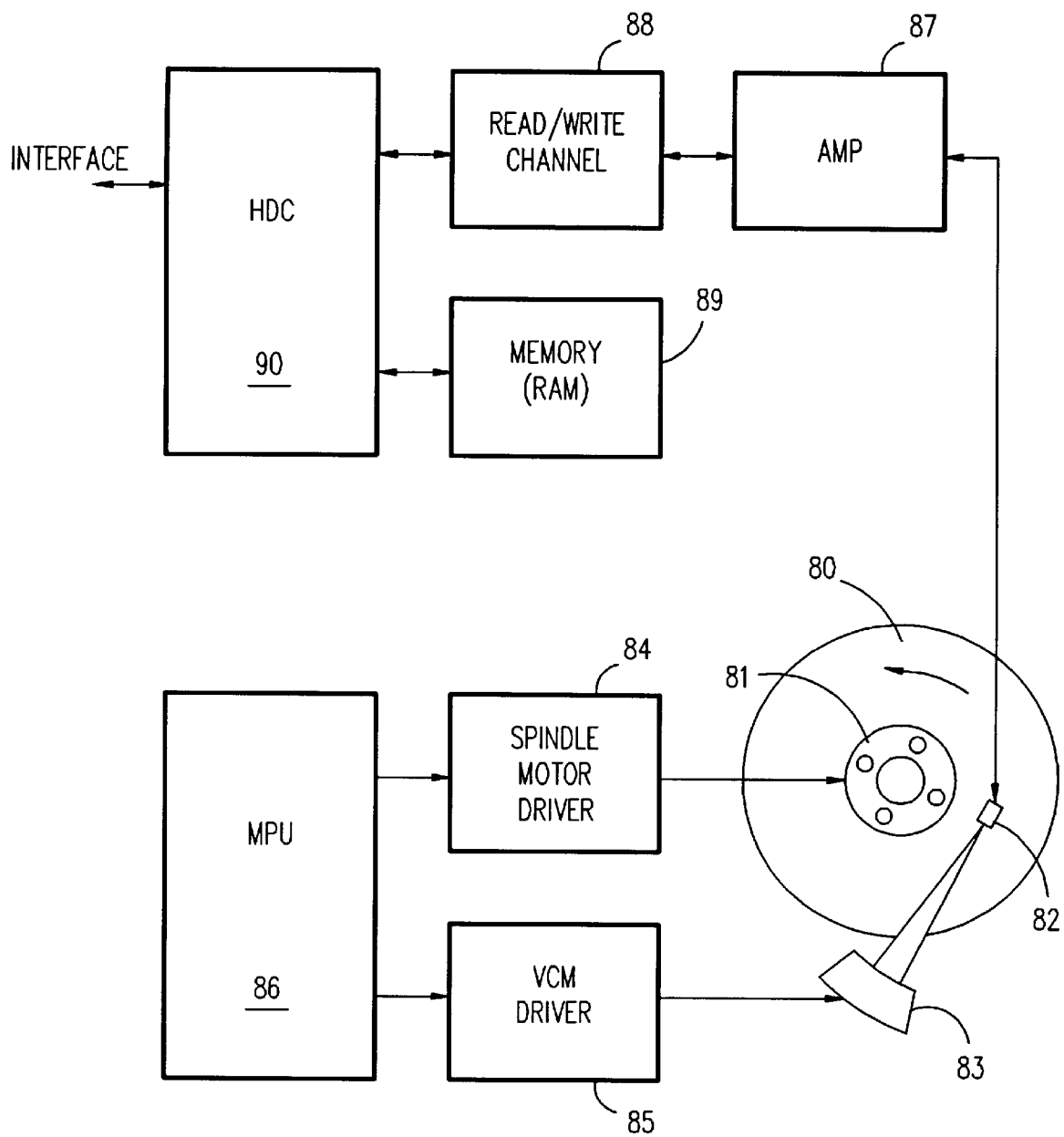
FIG. 10 is a block diagram of a disk drive of a preferred embodiment of the present invention.

FIG. 10 is a block diagram of a disk drive of a preferred embodiment of the present invention. A spindle motor 81 rotates a disk 80 at a high speed. A head 82 reads data from and writes data to the disk 80. A voice coil motor (VCM) 83 positions the head 82 with respect to the disk 80. The spindle motor 81 and VCM 83 are connected to a microprocessor unit (MPU) 86. A spindle motor driver 84 and a VCM driver 85 control the spindle motor 81 and VCM 83, respectively.

The signal from the head 82 is transmitted through an amplifier (AMP) 87 and read/write channel 88 to a hard-disk controller (HDC) 90. The HDC 90 connects to a host through a predetermined interface. A memory (RAM) 89 is connected to the HDC 90 and is used as a sector buffer memory to temporarily store data for reading or writing. The memory 89 also temporarily stores the offset quantity table and the head sequence table of the present invention. The described head switching operation references the offset quantity table and the head switching table.

For example, the host sends a command to read data to the HDC 90 through the interface. If the HDC 90 receives a command, the HDC 90 informs the MPU 86 that a command was input. The MPU 86 interprets the command as a read command and obtains a cylinder, a head, and a sector address to execute a seek operation. After positioning the head over the desired track, a data read operation starts. If the data to be read extends to a next track of he cylinder, i.e., the next head, the next head is determined by referring to the offset quantity table and the head sequence table. In accordance with this decision, a switch is made from the current head to the next head and sequential blocks of data continue to be read. When the maximum offset quantity of the offset quantity table exceeds two tracks, one of the two different head sequence tables is selected, preferably depending on whether the current cylinder number is an even or an odd number, and the head switching is executed in sequence defined in the selected table. Alternatively, instead of using two different head sequence tables, a single head sequence table may be read in reverse order each time a cylinder is changed.

As described above, when the current head is the last head in the current cylinder and the cylinder needs to be changed for processing sequential data, a different head switching sequence is chosen if the maximum offset quantity exceeds two tracks. Therefore, if the maximum offset quantity is less than two tracks, the current head is switched to the first head specified in the head sequence table, and the operation continues at the next cylinder. On the other hand, if the maximum offset quantity exceeds two tracks, the current head is positioned over the next cylinder, and the operation, e.g. a data read operation, continues.

In addition, in a data write operation, head switching is similarly executed by referring to the head sequence tables and the offset quantity table. Since the tables are preferably stored in the memory 89, the time needed to refer to the tables is very short. Thus, the head switching sequence is set so that the seek operation and seek time to switch heads is minimized. As a result, the operation of reading and writing sequential data, which requires switching heads, is efficiently executed.

Although the invention has been described using a magnetic disk drive, the invention is not meant to be limited to magnetic disk drives. The invention also applies to other storage devices such as optical recording devices using optical heads. Also, the invention is not limited to double-sided disks, but applies to single-side disks having a recording surface on only one side of the disk.

The present invention reduces the seek time in switching heads. Therefore, a considerable performance improvement is achieved in reading or writing data to disk drives having multiple heads.

We claim:

1. A storage device comprising:
   a plurality of recording surfaces;
   a plurality of heads, each head opposed to one of the recording surfaces, the heads for reading data from or writing data to the plurality of recording surfaces;

an offset quantity table which stores an offset quantity for each of the plurality of heads, each offset quantity being a value representative of the distance of the head with respect to a reference head;

a means for determining a head switching sequence based on the offset quantity stored in the offset quantity table;

a head sequence table which stores a predetermined head switching sequence;

means for executing a head switching operation using the head switching sequence stored in the head sequence table; and a means for alternately executing a head switching operation according to the head switching sequence and a head switching operation according to a reverse sequence of the head switching sequence if the maximum offset quantity value is greater than a predefined value.

2. The storage device as set forth in claim 1, wherein the predefined value is two.

3. The storage device as set forth in claim 1, wherein the reference head is the one of the plurality of heads which is positioned nearest to the outermost side of the recording surface.

4. The storage device as set forth in claim 1, wherein the reference head is the one of the plurality of heads which is positioned nearest to the recording surface center.

5. A method for switching heads in a storage device having a plurality of recording surfaces for storing data and a plurality of heads each opposed to a corresponding one of the recording surfaces, the heads being used for at least either a data write operation or a data read operation, comprising the steps of:

referring to a table defining a head switching sequence based on an offset quantity for each of the plurality of heads with respect to a reference head;

switching heads using the head switching sequence defined in the table; and after positioning the plurality of heads to another cylinder, switching heads in a reverse order from the head switching sequence if the maximum value of the offset quantity is greater than a predefined number.

6. The method for switching heads as set forth in claim 5, wherein the predefined number is two.

7. The method for switching heads as set forth in claim 5, wherein the reference head is the one of the plurality of heads which is positioned nearest to the outermost side of the recording surface.

8. The method for switching heads as set forth in claim 5, wherein the reference head is the one of the plurality of heads which is positioned nearest to the recording surface center.

* * * * *